United States Patent
Synal

(10) Patent No.: US 10,153,993 B2
(45) Date of Patent: Dec. 11, 2018

(54) RCS ORIGINATION FORKING

(71) Applicant: T-Mobile USA, Inc., Bellevue, WA (US)

(72) Inventor: Adrian Synal, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 140 days.

(21) Appl. No.: 15/212,628

(22) Filed: Jul. 18, 2016

(65) Prior Publication Data

US 2018/0019958 A1   Jan. 18, 2018

(51) Int. Cl.
  *H04L 12/58*   (2006.01)
  *H04L 29/06*   (2006.01)
  *H04L 12/761*  (2013.01)

(52) U.S. Cl.
  CPC .............. *H04L 51/04* (2013.01); *H04L 45/16* (2013.01); *H04L 65/1006* (2013.01)

(58) Field of Classification Search
  CPC ..... H04L 45/16; H04L 51/04; H04L 65/1006; H04L 65/1016; H04L 65/1063; H04W 60/00
  See application file for complete search history.

(56) References Cited

U.S. PATENT DOCUMENTS

| 7,856,470  | B2  | 12/2010 | Raghav et al. |
| 8,176,184  | B2  | 5/2012  | Staack et al. |
| 9,231,894  | B1  | 1/2016  | Dietz et al. |
| 9,288,276  | B2  | 3/2016  | Adamczyk et al. |
| 9,372,963  | B2  | 6/2016  | Lau et al. |
| 9,560,681  | B2  | 1/2017  | Bouvet |
| 9,615,201  | B2* | 4/2017  | Alkabra ................. H04W 4/021 |
| 9,906,616  | B2  | 2/2018  | Sharma et al. |
| 9,948,777  | B2  | 4/2018  | Ghuli et al. |
| 2003/0095569 | A1 | 5/2003 | Wengrovitz et al. |
| 2005/0213580 | A1* | 9/2005 | Mayer ..................... H04L 51/04 709/226 |
| 2005/0243746 | A1* | 11/2005 | Mutikainen ......... H04L 65/1069 370/282 |
| 2006/0149811 | A1* | 7/2006 | Bennett ............... H04L 65/1006 709/203 |

(Continued)

FOREIGN PATENT DOCUMENTS

| KR | 20120129349 | 11/2012 |
| KR | 20130123732 | 11/2013 |

OTHER PUBLICATIONS

PCT Search Report and Written Opinion dated Oct. 17, 2017, for PCT application No. PCT/US17/40682, 15 pages.

(Continued)

*Primary Examiner* — Alina A Boutah
(74) *Attorney, Agent, or Firm* — Lee & Hayes, PLLC

(57) ABSTRACT

In an IMS (IP multimedia system) and/or RCS (rich communication services) environment, devices that support origination forking of various message types are configured to register with an IMS network and to provide an indication that they support origination forking. The IMS network is configured to record this information for its subscribing devices. When the IMS network receives a message request from an origination device, the message request is forwarded to termination devices as well as to other supporting devices that are associated with the user of the origination device.

18 Claims, 5 Drawing Sheets

(56) References Cited

U.S. PATENT DOCUMENTS

| | | | |
|---|---|---|---|
| 2006/0155814 A1 | 7/2006 | Bennett et al. | |
| 2006/0253873 A1* | 11/2006 | Lim | H04L 51/04 725/62 |
| 2006/0271635 A1 | 11/2006 | Raghav et al. | |
| 2007/0195805 A1* | 8/2007 | Lindgren | H04L 65/1016 370/401 |
| 2007/0286164 A1* | 12/2007 | Haruna | H04L 29/06027 370/352 |
| 2008/0162637 A1 | 7/2008 | Adamczyk et al. | |
| 2008/0310312 A1 | 12/2008 | Acharya et al. | |
| 2009/0068996 A1* | 3/2009 | Bakker | H04L 65/1016 455/414.1 |
| 2009/0204681 A1* | 8/2009 | Sun | H04L 51/24 709/206 |
| 2009/0213826 A1* | 8/2009 | Wang | H04W 4/14 370/338 |
| 2009/0248810 A1* | 10/2009 | Zhu | H04L 12/14 709/206 |
| 2009/0258633 A1* | 10/2009 | Kim | H04L 51/14 455/412.2 |
| 2010/0054239 A1* | 3/2010 | Torres | H04L 47/80 370/352 |
| 2010/0087215 A1* | 4/2010 | Gu | H04W 4/18 455/466 |
| 2010/0185740 A1* | 7/2010 | Lee | H04L 51/14 709/206 |
| 2010/0325224 A1* | 12/2010 | Pattan | H04L 65/1006 709/206 |
| 2011/0103372 A1* | 5/2011 | Shatsky | H04L 65/1016 370/352 |
| 2011/0103373 A1* | 5/2011 | Shatsky | H04L 65/1016 370/352 |
| 2011/0264824 A1 | 10/2011 | Venkata Subramanian et al. | |
| 2012/0084377 A1* | 4/2012 | Lee | H04L 12/58 709/206 |
| 2012/0089693 A1 | 4/2012 | Lu et al. | |
| 2012/0144048 A1 | 6/2012 | Jarvenpaa et al. | |
| 2012/0166626 A1* | 6/2012 | Rai | H04L 12/6418 709/224 |
| 2012/0188892 A1 | 7/2012 | Demilie | |
| 2013/0036183 A1* | 2/2013 | Lu | H04L 51/28 709/206 |
| 2014/0047122 A1 | 2/2014 | Haserodt et al. | |
| 2014/0059118 A1* | 2/2014 | Pidady | H04L 67/06 709/203 |
| 2014/0068710 A1 | 3/2014 | Lau et al. | |
| 2014/0141821 A1* | 5/2014 | Dietz | H04L 51/04 455/466 |
| 2014/0195607 A1* | 7/2014 | Kowalewski | H04L 65/1016 709/204 |
| 2015/0055550 A1* | 2/2015 | Suryavanshi | H04W 60/00 370/328 |
| 2015/0117444 A1* | 4/2015 | Sandblad | H04L 65/1059 370/352 |
| 2015/0163838 A1 | 6/2015 | Bouvet | |
| 2015/0304326 A1 | 10/2015 | Lee et al. | |
| 2016/0105468 A1* | 4/2016 | Mufti | H04L 65/1069 709/228 |
| 2016/0110771 A1 | 4/2016 | Klein et al. | |
| 2016/0149836 A1* | 5/2016 | Narayanan | H04L 51/04 709/206 |
| 2016/0156783 A1 | 6/2016 | Mufti et al. | |
| 2016/0165600 A1* | 6/2016 | Choi | H04L 5/0055 370/336 |
| 2016/0219093 A1* | 7/2016 | Gangadharan | H04L 65/1006 |
| 2016/0330320 A1 | 11/2016 | Ghuli et al. | |
| 2016/0352855 A1 | 12/2016 | Sharma et al. | |
| 2017/0054764 A1* | 2/2017 | Sharma | H04L 65/1069 |
| 2017/0070456 A1* | 3/2017 | Norhammar | H04N 21/234336 |
| 2017/0070543 A1* | 3/2017 | Balasubramanian | H04L 65/1069 |
| 2017/0208462 A1* | 7/2017 | Zaifuddin | H04W 12/06 |
| 2018/0019957 A1 | 1/2018 | Synal | |
| 2018/0019958 A1 | 1/2018 | Synal | |

OTHER PUBLICATIONS

PCT Search Report and Written Opinion dated Oct. 17, 2017 for PCT application No. PCT/US17/40677, 15 pages.

Office Action for U.S. Appl. No. 15/212,628, dated May 29, 2018, Synal, "RCS Origination Forking", 10 pages.

* cited by examiner

RCS ORIGINATION FORKING

BACKGROUND

The use of mobile devices such as cellular telephones and other devices with cellular data connectivity is proliferating. Almost everyone has some sort of mobile, data-enabled device, and many people have multiple devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications that provide greatly improved user experiences.

Various types of communications may be supported by network-provided services referred to as Rich Communication Services (RCS). RCS is designed to provide enhanced communications between mobile devices, including mobile devices that are supported by different operators. Among other things, RCS provides for enhanced messaging, which may include chat, file sharing, location sharing, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
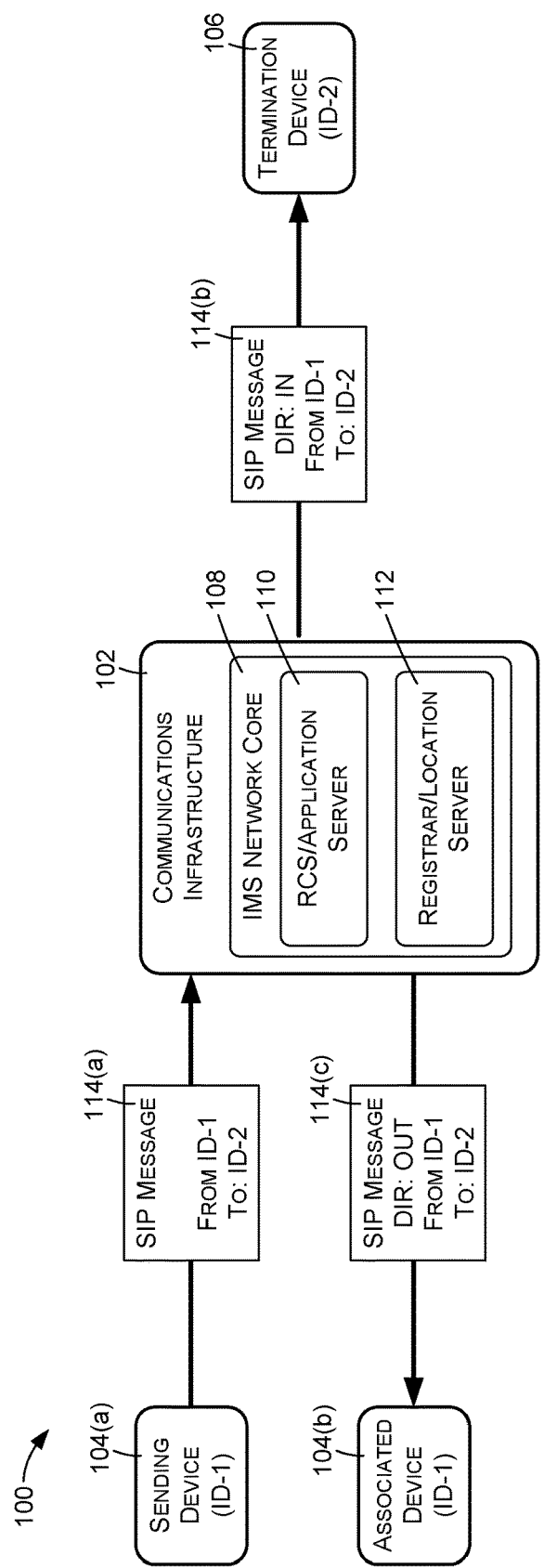
FIG. 1 is a block diagram illustrating an example communications infrastructure that provides communications with and between multiple devices, and also illustrating handling of SIP (session initiation protocol) requests.

The described implementations provide devices, systems, and methods for origination forking of outgoing messages such as may be used in conjunction with RCS (rich communication services). In described embodiments, for example, a user may have multiple devices that are configured to send and receive RCS communications using a common SIP URI (uniform resource identifier). Examples of devices include smartphones, tablet computers, wearable devices, and personal computers, all of which may configured to send and receive communications using a single, common telephone number or other URI.

Each device may have an RCS communications client that presents a history of communications between parties. Often, such a communications client will differentiate between outgoing messages and incoming messages, where outgoing messages are the messages sent by the user of the device and incoming messages are the messages received from other users. For example, outgoing messages may be displayed on one side of a display window and incoming messages may be displayed on the other side of the display window. In the case where multiple devices are associated with a user's single SIP URI, all communications originating from the user's SIP URI should be shown as outgoing, regardless of which of the user's devices actually sent the message and regardless of which of his or her devices the user is currently using.

When communicating with other devices, an origination device associated with a first user may send a SIP message addressed to a second user. The SIP message may have a FROM field indicating the user ID of the first user and a TO field indicating the user ID of the second user.

The SIP message is sent by the origination device to an RCS server, which forwards the message to any devices that are associated with the URI of the second user. In addition, when the first user has additional devices that are associated with the first user's user ID, the RCS server sends the SIP message back to these additional devices of the first user. This is referred to as origination forking.

For a message request that is forwarded to both origination and termination devices, the RCS server inserts a header indicating whether the specified message is incoming or outgoing with respect to the receiving device. As an example, the header may be specified within a CPIM (common presence and instant message) data object of the MSRP message request. Upon receiving a message request, a receiving device checks the header and classifies a received message as either incoming or outgoing based on the value of the header. If the received message is classified as outgoing, the message is placed on the "outgoing" side of the displayed conversation thread, even though the message may not have originated with the device itself, but may instead have originated with a device having the same user ID.

The RCS server is configured to keep track of which devices support origination forking. When registering for RCS, a device that supports origination forking includes a "self-fork" flag or other token as part of the request-disposition header in a SIP REGISTER message to an RCS server. The RCS server records this information for each device that supports origination forking. If a device has not indicated that it supports origination forking, the RCS server does not automatically fork an outgoing message back to that device, and the device may have to rely upon other methods to synchronize its thread history.

FIG. 1 illustrates a mobile communication system 100 in which the described techniques may be implemented. The system 100 comprises a communications infrastructure 102 that provides communications between multiple origination RCS devices 104 and one or more termination devices 106. Each of the originating and termination devices 104 and 106 may comprise a device having network communication capabilities such as a smartphone, a telephone handset, a headset, a wearable device, a computer, a personal computer, a desktop computer, a laptop computer, a tablet computer, etc. The communication capabilities of the devices 104 and 106 may include Wi-Fi capabilities, cellular or other telephony capabilities, and/or other wired or wireless network communication capabilities.

FIG. 1 shows multiple origination devices 104 and a single termination device 106. For purposes of discussion, it will be assumed that both of the origination devices 104 are associated with a single sending user and a corresponding user ID, which for purposes of discussion is shown as ID-1, and which may in practice comprise a SIP URI.

It will be assumed in the following discussion that the sending user uses a first originating device 104(a), which will be referred to as a sending device, to send a message to a receiving user of the termination device 106. The receiving user has a user ID that is associated with the termination device 106, which for purposes of discussion is shown as ID-2, and which may also comprise a SIP URL.

It will also be assumed that the communications infrastructure 102 forks the message request 114 back to a second device 104(b) of the sending user. The second device 104(b), to which the sending user's message is forked, will be referred to as the first user's associated device. The sending device 104(a) and the associated device 104(b) have the same user ID ID-1, and are associated with the same user.

Although only the origination devices 104 associated with a single user are shown in FIG. 1, many different origination devices 104, associated with many different users, may access the communication infrastructure 102 in order to initiate communications with one or more devices of receiving users. Similarly, although only a single termination device 106 is shown in FIG. 1, large numbers of devices, associated with many users, may be used in the system 100. Furthermore, any given device may act as either an origination device or a termination device in a given communication.

The communications infrastructure 102 may comprise a telephonic, cellular communications network, as an example. In some cases, for example, the communications infrastructure 102 may comprise a wireless, cellular communications network implemented in accordance with the System Architecture Evolution (SAE) communication standard and provided by a cellular communication services provider. In certain implementations, the system 100 may be implemented at least in part as a long-term evolution (LTE) cellular network. More generally, the system 100 may be implemented using any of various wireless networking technologies, including GSM (global system for mobile), GPRS (general packet radio service), EDGE (enhanced data rates for GSM evolution), UMTS (universal mobile telecommunications system), CDMA (code-division multiple access), various types of packet-switched networks, IEEE 702.11 networks (generally referred to as Wi-Fi), and so forth.

In LTE and other cellular environments, the communications infrastructure 102 may comprise a number of geographically dispersed base stations (not shown), comprising radio transceivers and antennas for communicating with corresponding transceivers of the devices 104 and 106. In many cases, the cellular infrastructure may provide connectivity with the Internet and various services and servers that are accessible through the Internet.

The communications infrastructure 102 may include an IMS (IP multimedia system) network core 108, which may be referred to at times simply as an IMS network. The IMS network 108 provides RCS services, which may be implemented as one or more RCS and/or application servers 110. The IMS network 108 may also implement a registrar server and/or location server 112, with which individual devices register using SIP protocols in order to indicate their availability and other information to the IMS network core 108. As will be described in more detail below, some devices may use the process of registration to indicate whether they support origination forking.

Note that different ones of the devices 104 and 106 may use different wireless networking technologies for accessing the telephonic communications network. For example, one device may use Wi-Fi connectivity while another device may use a cellular connection. Yet another device may connect to the communications network through a wired Ethernet connection.

The communications infrastructure 102 may include services in addition to those shown in order to support communications between originating devices and termination devices. Types of provided supported communications may include voice communications, video communications, textual communications, and so forth.

In certain situations, the sending device 104(a) may send a first SIP message request 114(a) to a user associated with the user ID ID-2, who is in turn associated with the termination device 106. The SIP message request 114(a) may comprise a SIP MESSAGE method, for example, and may include FROM and TO fields. The FROM field indicates the user ID of the user that is sending the message, which in this case is ID-1. The TO field indicates the user ID of the user to whom the message is addressed, which in this case is ID-2.

The RCS/application server 110 receives the SIP message request 114(a) from the sending device 104(a) and forwards it to the one or more termination devices that are associated with the user ID specified by the "TO" field via the communications infrastructure 102. Thus, in the illustrated example, the message request 114(a) is forwarded to the termination device 106 based on the TO field value ID-2. In addition, the server 110 forwards the message request 114(a) to any additional devices that are associated with the user ID specified by the "FROM" field.

When forwarding the SIP message request 114(a), the RCS/Application server 110 adds a header to the SIP message request 114(a), indicating for each recipient of the request whether the content is incoming or outgoing with respect to the recipient. More specifically, the RCS/application server 110 creates a second SIP request 114(b), based on the first SIP message request 114(a), to the termination device 106, wherein the second MSRP request 114(b) specifies the same content as the first SIP request 114(a). The second SIP request 114(b) contains a header, which may comprise a header within a CPIM data object of the request 114(b), indicating that the second SIP request 114(b) specifies incoming content with respect to the termination device 106. In this example, the header comprises a name/value pair "DIR: IN".

The RCS/application server 110 also creates a third SIP request 114(c) to the associated device 104(b), wherein the third SIP request 114(c) specifies the same content as the first SIP request 114(a). The third SIP request 114(c) also contains a header, which in certain implementations may comprise a header within a CPIM data object of the request 114(c), indicating in this case that the third SIP request 114(c) specifies outgoing content with respect to the associated device 106. In this example, the header comprises a name/value pair "DIR: OUT".

The following is a specific example of how such a header may be specified within a CPIM data object:

NS: MD<mailto: RCS@ADOMAIN. COM>

MD. Direction: OUT|IN

Upon receiving the SIP message request 114(c), the associated device 104(b) checks the "direction" header. If the direction header indicates that the request is for an outgoing message, the message is displayed as an outgoing message in any displayed conversation thread. If the direction header indicates that the request is for an incoming message, the message is displayed as an incoming message in any displayed conversation thread.

Figure 2:
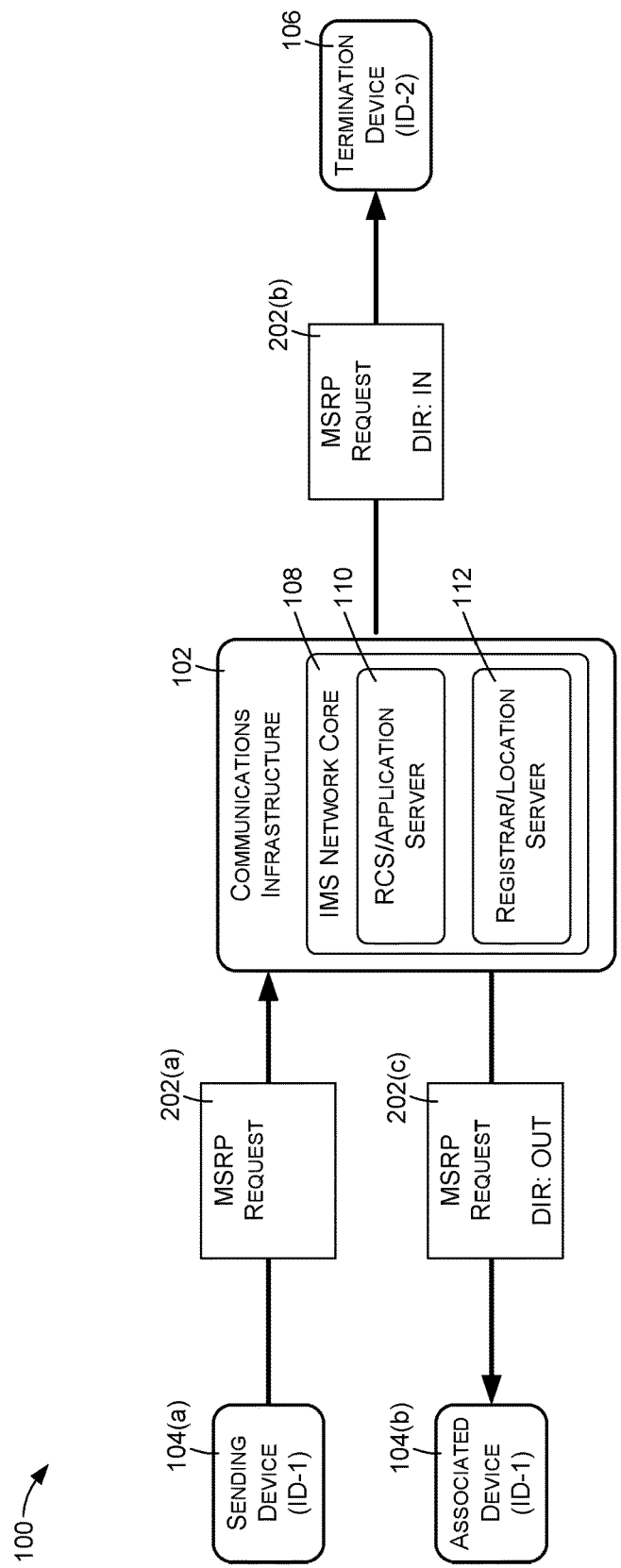
FIG. 2 is a block diagram illustrating the example communications infrastructure of FIG. 1, and also illustrating handling of MSRP (message session relay protocol) requests.

FIG. 2 illustrates the same mobile communication system 100 as FIG. 1, except that in this case content is being communicated using MSRP (message session relay protocol) message requests 202. MSRP is used within RCS for certain types of real-time session based communications that do not fit within the in-signal SIP messaging, such as one to one and group chat.

The sending device 104(a) sends a first message request 202(a) to the termination device 106 through the IMS network 108. The MSRP specifies message content. Message content may, for example, be specified as a CPIM (common presence and instant messaging) data object.

The RCS/application server 110 receives the first message request 202(a) and forwards it to the termination device 106 and also to the associated device 104(b). When forwarding, the RCS/application server 110 adds a header to the request, indicating for each recipient of the request whether the content is incoming or outgoing with respect to the recipient.

More specifically, the RCS/application server 110 creates a second MSRP request 202(b) to the termination device 106, wherein the second MSRP request 202(b) specifies the same content as the first MSRP request 202(a). The second MSRP request 202(b) contains a header, which may comprise a header within a CPIM data object of the request 202(b), indicating that the second MSRP request 202(b) specifies incoming content with respect to the termination device 106. In this example, the header comprises a name/value pair "DIR: IN".

The RCS/application server 110 also creates a third MSRP request 202(c) to the associated device 104(b), wherein the third MSRP request 202(c) specifies the same content as the first MSRP request 202(a). The third MSRP request 202(c) also contains a header, which may comprise a header within a CPIM data object of the request 202(c), indicating in this case that the third MSRP request 202(c) specifies outgoing content with respect to the associated device 106. In this example, the header comprises a name/value pair "DIR: OUT".

The following is a specific example of how such a header may be specified within a CPIM data object:

NS: MD<mailto: RCS@ADOMAIN. COM>
MD. Direction: OUT|IN

Upon receiving the MSRP message request 202(a), the associated device 104(b) checks the "direction" header. If the direction header indicates that the request is for an outgoing message, the message is displayed as an outgoing message in any displayed conversation thread. If the direction header indicates that the request is for an incoming message, the message is displayed as an incoming message in any displayed conversation thread.

It may be that some devices, referred to as non-supporting devices herein, are not configured to determine whether a received message should be indicated as being an outgoing message or as an incoming message. For example, a non-supporting device may not be configured to recognize the header of an MSRP message in order to determine whether a received message should be indicated as being incoming or outgoing. Accordingly, the RCS/Application server 110 may be configured to record the capabilities of registered devices, and accordingly to keep track of which registered devices support origination forking as described above.

To allow the RCS/application server to determine whether a registering device supports reception of self-forked messages, devices that support origination forking may indicate such support during network registration and/or during other communications. For example, each device may periodically register with the registrar/location server 112 using a SIP REGISTER message. In certain implementations, a flag or other token may be specified in the request header of the SIP REGISTER message to the registrar/location server. The flag may indicate that the device providing the message supports origination forking. The registrar/location server 112 may record this information each time the device registers and/or each time the device communicates with the RCS/application server 110.

As a more specific example, a tag may be specified in the request-disposition header of a SIP REGISTER message or other SIP message by a sending device, indicating that the device providing the message supports origination forking. The absence of the tag may be understood to mean that the device does not support origination forking.

Figure 3:
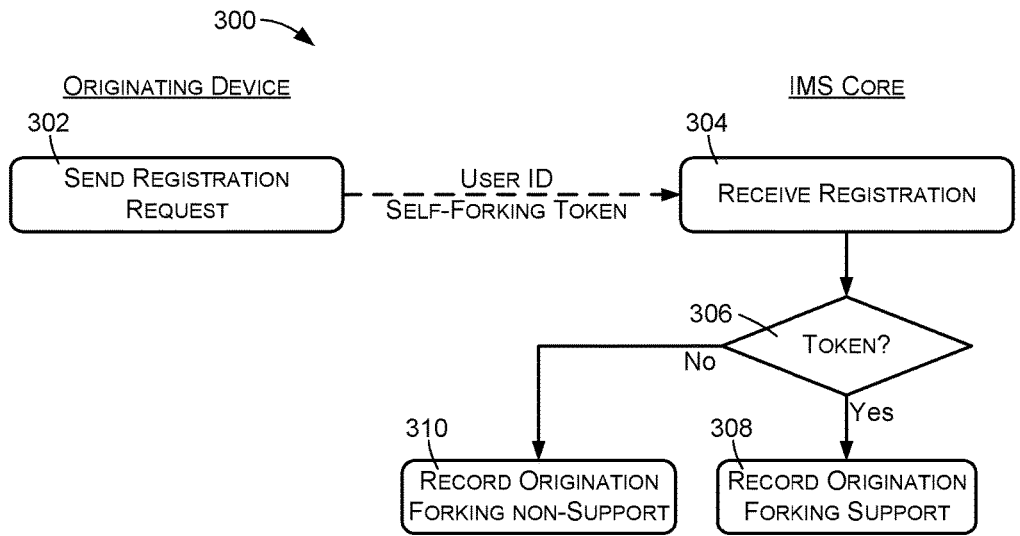
FIG. 3 is a flow diagram illustrating an example method of registering a device with a communications network and of indicating support for origination forking.

FIG. 3 shows an example method 300 that may be performed in order to indicate and record the support of origination forking by subscribing devices. The actions on the left-hand side of FIG. 3 are performed by an originating device and the actions on the right-hand side of FIG. 3 are performed by a component of the IMS network core, such as by the registrar/location server 112 of the network core 108.

An action 302, performed by the origination device, comprises registering the availability of the origination device with the IMS network, such as by sending a SIP REGISTRATION request to the registrar/location server 112. The SIP REGISTRATION request may be sent periodically, such as when the origination device first becomes available to the IMS network and/or at other times depending on implementation.

Among other things, the SIP REGISTRATION request includes the user ID associated with the origination device. The SIP REGISTRATION request may also include a self-forking data token indicating that the origination device is capable of determining that received SIP messages are outgoing messages that have been sent from the user of the origination device. That is, the presence of the data token indicates that the registering origination device is configured to properly handle messages that have been forked back to the origination device from a different origination device having the same user ID. In one implementation, the self-forking token may be specified as a request-disposition field in a request header of a SIP REGISTRATION request.

An action 304, performed by the registrar/location server 112 of the network core 108, comprises receiving the registration request from the origination device. The registration request may or may not specify the self-forking token.

A subsequent action 306 performed by the registrar/location server 112 comprises determining whether the self-forking token was present in the registration request. If the self-forking token was present, an action 308 is performed of recording that the origination device from which the SIP REGISTRATION request was received does support origination forking. If the self-forking token was not present, an action 310 is performed of recording that the origination device from which the SIP REGISTRATION request was received does not support origination forking.

Note that the self-forking data token may be provided in different ways, such as a name-value pair, a tag, a flag, a value, etc. Furthermore, the origination device may indicate its support of origination forking within communications other than SIP REGISTRATION messages. For example, various types of SIP messages or methods sent from an origination device may include a request header and a request-disposition field, and the request disposition field can be used to indicate whether the origination device supports origination forking in these various types of SIP messages.

Note also that upon receiving a SIP REGISTRATION request, the registrar/location server 112 will record other capabilities of the origination device and may perform other actions in order to process the SIP REGISTRATION request.

Figure 4:
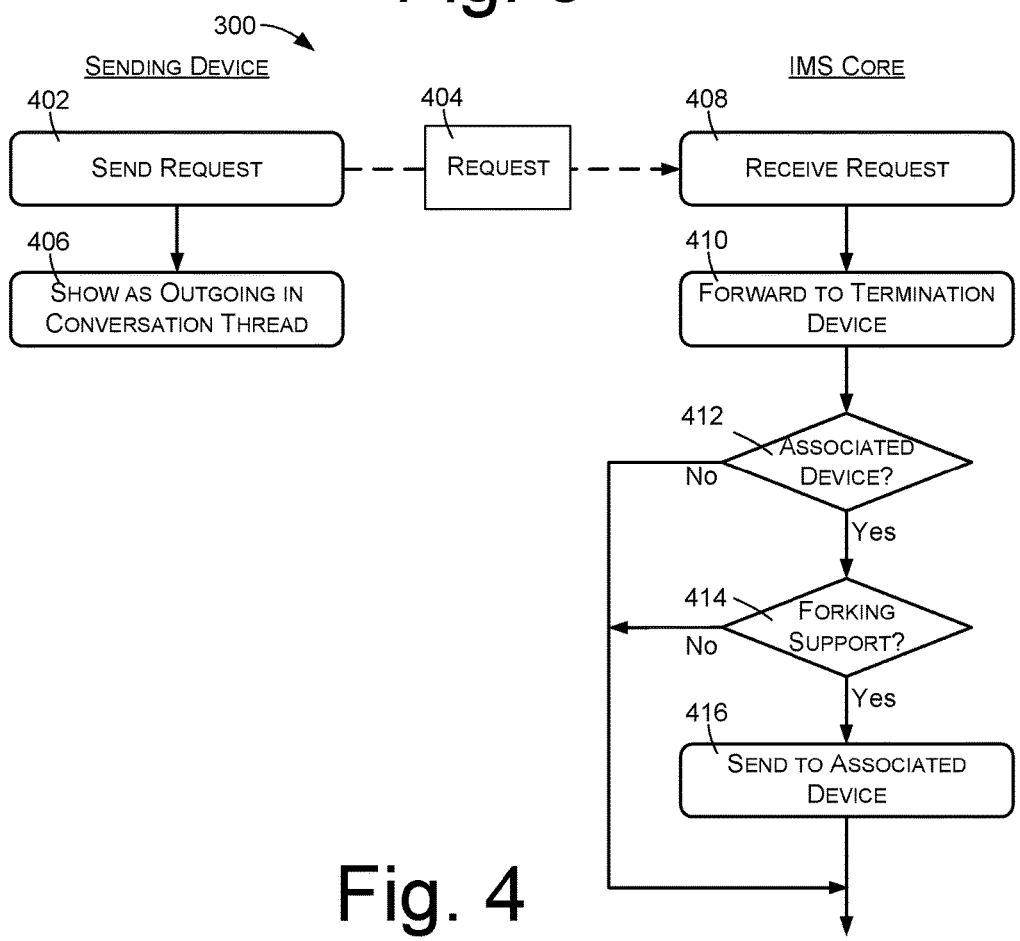
FIG. 4 is a flow diagram illustrating an example method of forking messages to origination devices.

FIG. 4 shows an example method 400 that may be used in the environment described with reference to FIG. 1 to perform origination forking. The actions on the left-hand side of FIG. 3 are performed by an originating device, which for clarity is referred to as a sending device, and the actions on the right-hand side of FIG. 3 are performed by a component of the IMS network core, such as by the registrar/location server 112 of the network core 108. The example of FIG. 4 assumes that a sending user uses both the sending device and an associated device, both of which have been associated with the user ID of the sending user. The method 400 may be used to handle both SIP message requests and MSRP message requests.

An action 402, performed by the sending device, comprises sending a message request 404 to the IMS network. In the case of a SIP message request, the request 404 contains a FROM field that indicates the user ID of the sending device and a TO field that indicates the user ID of a recipient or termination device. The user IDs may comprise SIP URIs. The SIP message request may also include or specify a content payload, such as the text of a textual message that is to be delivered to the user associated with the TO user ID. The message request is send to the IMS core 108, which is expected to forward the message request to the intended TO recipient.

In the case of an MSRP message request, the request 404 may not specify a FROM field or a TO field, and instead the message request may be forwarded as part of a session that has been previously established between two or more devices. The MSRP message request may specify content in the form of a CPIM data object.

In conjunction with sending the message request 404, the sending device displays the content or payload of the message request within a threaded conversation. The message is indicated within the displayed conversation as being an outgoing message, from the user of the sending device.

The IMS core performs an action 408 of receiving the message request 404, and an action 410 of forwarding the message request 404 to termination devices. In the case of a SIP message request, the message request 404 is forwarded to any devices that have been registered as being associated with the TO user ID of the SIP message request 404. In the case of an MSRP device, the message request 404 may be forwarded in accordance with session parameters of a previously established session.

An action 412, performed by the IMS core, comprises determining whether there are any additional devices other than the sending device that are associated with the same user ID as the sending device. As mentioned above, such devices are referred to herein as associated devices, in that they are associated with the same user ID and the same user as the sending device.

If there are no such devices that are commonly associated with the sending user, no further action is taken with respect to the message request 404. If there is an associated device, an action 414 is performed, comprising determining whether the associated device supports origination forking. This may be accomplished by querying the registrar/location server 112 to determining whether it has previously recorded having received the self-forking token from the associated device. If the self-forking token has not been previously received from the associated device, indicating that the associated device does not support origination forking, no further action is taken with respect to the message request 404. If the self-forking token has previously been received from the associated device, indicating that the associated devices does support origination forking, an action 416 is performed. The action 416 comprises forwarding or otherwise sending the message request 404 to the associated device.

As described above, a header may be added to forwarded message request to indicate whether each forwarded request is incoming or outgoing with respect to the user of the receiving device. In some cases, the header may be part of a CPIM data object as described above.

Although the description of FIG. 4 refers to an original message request being forwarded to termination devices and associated devices, the action of forwarding may alternatively be described as creating new or duplicate requests, each of which specifies the same content or message as the original request. For example, the action 410 may comprise creating a second request to the termination device, wherein the second request specifies the same content as the request 404. Similarly, the action 416 may comprise creating a third request to the associated device, wherein the third request specifies the same content as the request 404.

Note that FIG. 4 shows only the high-level actions performed in the course of handling message forwarding and origination forking, and the IMS core and other components of the communications infrastructure 102 may perform various other actions in the course of handling and responding to a received SIP or MSRP message request.

Figure 5:
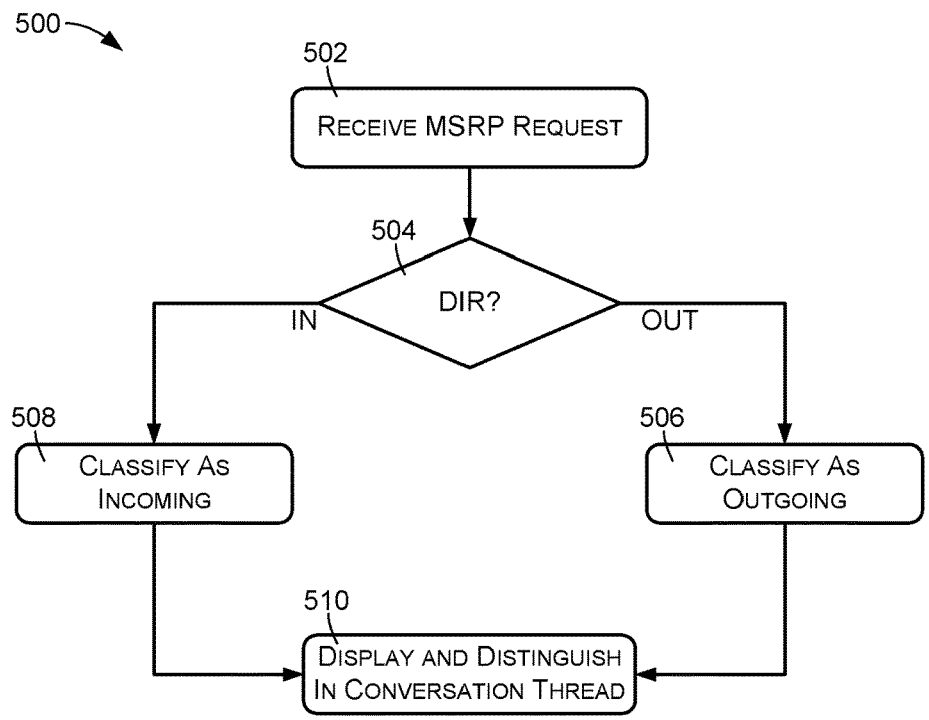
FIG. 5 is a flow diagram illustrating an example method of determining whether a received message is an incoming message or an outgoing message.

FIG. 5 illustrates an example method 500 that may be performed by a communication device in order to support origination forking. The method 500 is performed by a receiving device that is associated with a user and with the user ID of the user. In the context of FIG. 1, both the associated device 104(b) and the termination device 106 are considered to be receiving devices.

An action 502 comprises receiving an MSRP or SIP message request having a header that indicates whether the content of the message request is incoming or outgoing with respect to the user of the communication device. An action 504 comprises determining whether the header specifies a value of "IN" or a value of "OUT".

If the request header specifies a value of "OUT", an action 506 is performed of classifying the received message request as an outgoing message. If the request header specifies a value of "IN", an action 508 is performed of classifying the received message request as an incoming message.

An action 510, performed after classifying the message as described above, comprises displaying or otherwise presenting the content or payload of the message, such as displaying the message content in a threaded conversation view or window. The action 510 also comprises visually distinguishing outgoing messages from incoming messages. In certain embodiments, for example, incoming message may be displayed on one side of a sequential message view, and outgoing messages may be displayed on the other side of the sequential message view.

The actions described by FIG. 5 represents high-level actions that are performed by a receiving communication device and that are relevant to the topic at hand Various other actions may be performed in order to properly handle and display incoming message requests.

Figure 6:
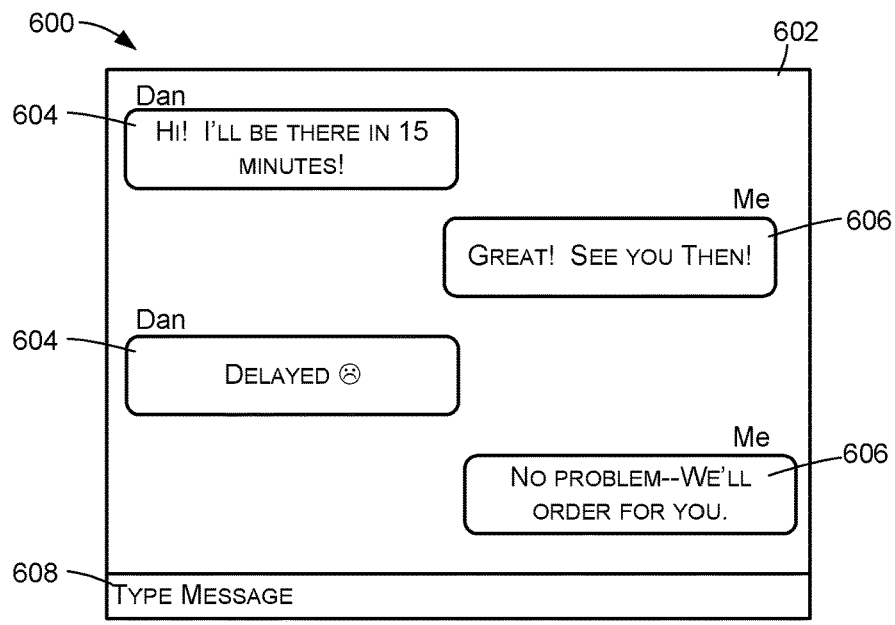
FIG. 6 is a view of an example display that may be generated in order to display received messages and to distinguish between incoming and outgoing messages.

FIG. 6 shows an example of a threaded conversation view 600 that may be used in some embodiments by a communication device to present inter-user messages and to distinguish between incoming and outgoing messages, wherein messages are considered incoming or outgoing with respect to device users rather than devices themselves.

In this example, the conversation view 600 comprises a window, pane, or display area 602 that displays a graphical message sequence. Within the window 602 are displayed dialog boxes 604 and 606. In this example, the dialog boxes 604 contain the text of incoming messages and are displayed along the left-hand side of the window 602. The dialog boxes 606 contain the text of outgoing messages and are displayed along the right-hand side of the window 602. In some embodiments, a name may be indicated over or adjacent each box to indicate the source of the message. In this example, the right-hand boxes contain outgoing messages from the user of the device upon which the messages are being displayed, and the user may therefore be referred to as "Me".

The window 602 may also include a text entry area 608 into which the user may enter the text of a new message.

Messages may include text, as well as pictures, audio, video, emoticons, hyperlinks, and various other types of information.

Figure 7:
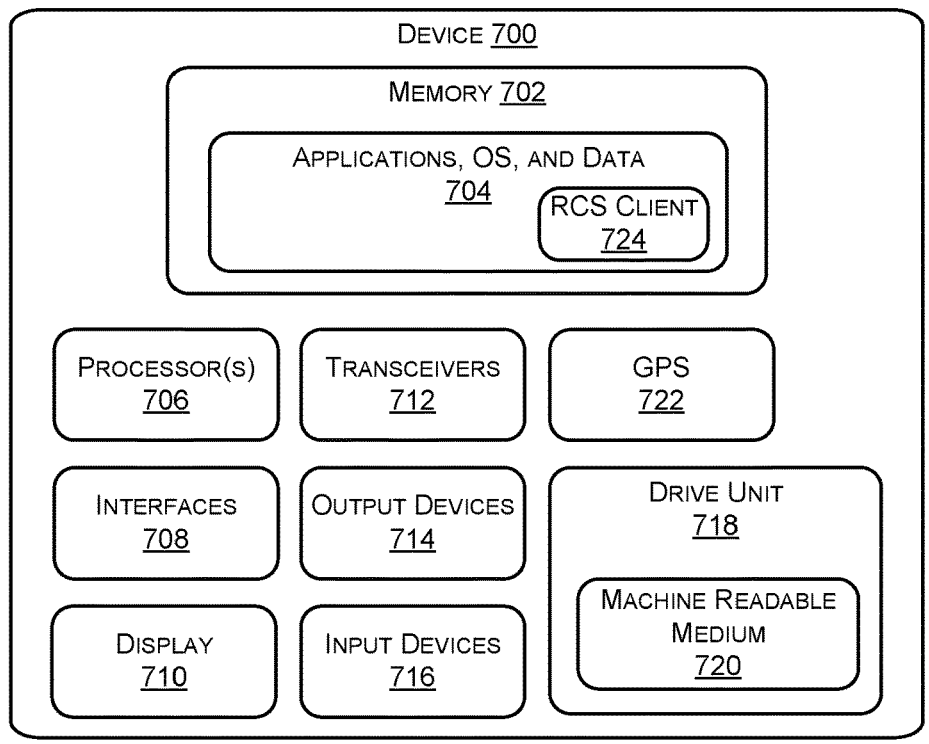
FIG. 7 is a block diagram of an example communication device that may be used in conjunction with the example methods described herein.
Figure 8:
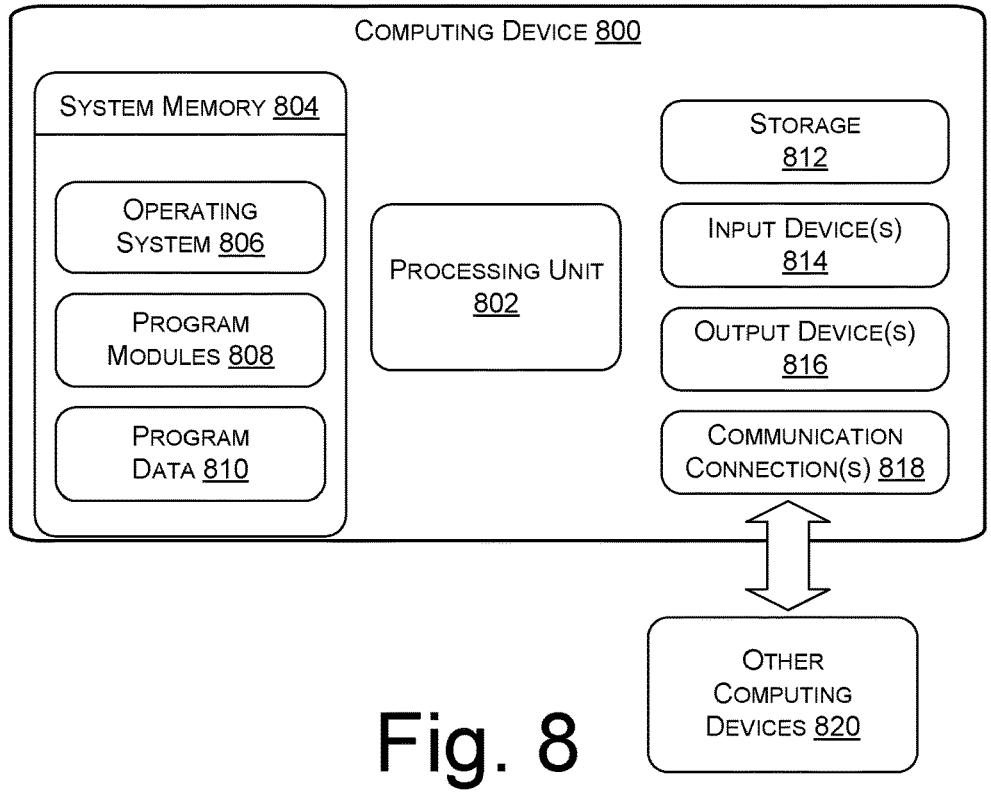
FIG. 8 is a block diagram of an example computing device that may be used to implement various components of a communications infrastructure, including servers of the communications infrastructure network described herein.

FIG. 7 illustrates an example device 700 in accordance with various embodiments. The device 700 is illustrative of example components of the devices 104 and 106.

The device 700 may include a memory 702, which may store applications, an operating system (OS), and data 704. The device 700 further includes processor(s) 706, interfaces 708, a display 710, radio transceivers 712, output devices 714, input devices 716, and a drive unit 718 including a machine readable medium 720.

In various embodiments, the memory 702 includes both volatile memory and non-volatile memory. The memory 702 can also be described as non-transitory computer storage media and may include removable and non-removable media implemented in any method or technology for storage of information, such as computer readable instructions, data structures, program modules, or other data. The applications, OS, and data 704 are stored in the memory 702. Additionally, in some embodiments, the memory 702 may include a SIM (subscriber identity module), which is a removable smart card used to identify a user of the device 700 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 700. Any such non-transitory computer-readable media may be part of the device 700.

In some embodiments, the processor(s) 706 is a central processing unit (CPU), a graphics processing unit (GPU), or both CPU and GPU, or other processing unit or component known in the art.

In various embodiments, the interfaces 708 are any sort of interfaces known in the art. The interfaces 708 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 702.11, 702.16 and/or 702.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 710 may comprise a liquid crystal display or any other type of display commonly used in telecommunication devices or other portable devices. For example, display 710 may be a touch-sensitive display screen, which may also act as an input device or keypad, such as for providing a soft-key keyboard, navigation buttons, or the like.

In some embodiments, the transceivers 712 include any sort of transceivers known in the art. For example, the transceivers 712 may include radio radios and/or radio transceivers and interfaces that perform the function of transmitting and receiving radio frequency communications via an antenna, through a cellular communication network of a wireless data provider. The radio interfaces facilitate wireless connectivity between the device 700 and various cell towers, base stations and/or access points.

In some embodiments, the output devices 714 include any sort of output devices known in the art, such as a display (already described as display 710), speakers, a vibrating mechanism, or a tactile feedback mechanism. The output devices 714 also include ports for one or more peripheral devices, such as headphones, peripheral speakers, or a peripheral display.

In various embodiments, the input devices 716 include any sort of input devices known in the art. For example, the input devices 716 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 700 may also have a GPS (global positioning system) receiver 722 for determining the current location of the device 700 based on signals received from satellites.

The machine readable medium 720 stores one or more sets of instructions (e.g., software) such as a computer-executable program that embodies operating logic for implementing and/or performing any one or more of the methodologies or functions described herein. The instructions may also reside, completely or at least partially, within the memory 702 and within the processor 706 during execution thereof by the device 700. The memory 702 and the processor 706 also may constitute machine readable media 720.

In some embodiments, the Applications, OS, and data 704 may include an RCS client 724, which may comprise an application or other software components for performing RCS communications in the manner described above.

FIG. 9 is a block diagram of an illustrative computing device 800 such as may be used to implement various components of the communication infrastructure 102 including servers, routers, gateways, administrative components, etc. For example, one or more computing devices 800 may be used to implement the RCS/application server 110 and the registrar/location server 112.

In various embodiments, the computing device 800 may include at least one processing unit 802 and system memory 804. Depending on the exact configuration and type of computing device, the system memory 804 may be volatile (such as RAM), non-volatile (such as ROM, flash memory, etc.) or some combination of the two. The system memory 804 may include an operating system 806, one or more program modules 808, and may include program data 810.

The computing device 800 may also include additional data storage devices (removable and/or non-removable) such as, for example, magnetic disks, optical disks, or tape. Such additional storage is illustrated in FIG. 9 by storage 812.

Non-transitory computer storage media of the computing device 800 may include volatile and nonvolatile, removable and non-removable media implemented in any method or technology for storage of information, such as computer readable instructions, data structures, program modules, or other data. The system memory 804 and storage 812 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such non-transitory computer-readable storage media may be part of the computing device 800.

In various embodiment, any or all of the system memory 804 and storage 812 may store programming instructions which, when executed, implement some or all of the function functionality described above as being implemented by the communications infrastructure 102, the RCS/application server 110, the registrar/location server 112, and/or any other services implemented by the infrastructure 102.

The computing device 800 may also have input device(s) 814 such as a keyboard, a mouse, a touch-sensitive display, voice input device, etc. Output device(s) 816 such as a display, speakers, a printer, etc. may also be included. The computing device 800 may also contain communication connections 818 that allow the device to communicate with other computing devices 820.

Although features and/or methodological acts are described above, it is to be understood that the appended claims are not necessarily limited to those features or acts. Rather, the features and acts described above are disclosed as example forms of implementing the claims.

What is claimed is:

1. A method performed by one or more communication servers, the method comprising:
   receiving a first MSRP (message session relay protocol) request from a first communication device, the first MSRP request specifying first content, the first communication device being associated with a first user;
   creating a second MSRP request to a second communication device that is associated with a second user, the second MSRP request specifying the first content;
   sending the second MSRP request to the second communications device;
   determining that the first user has another communication device associated with the first user;
   based at least in part on the determining that the first user has another communication device associated with the first user, creating a third MSRP request to a third communication device that is associated with the first user, the third MSRP request specifying the first content;
   configuring a first data token within the third MSRP request to indicate that the first content is outgoing with respect to the first user; and
   sending the third MSRP request to the third communications device to synchronize the first communication device with the third communication device with respect to the first content being outgoing with respect to the first user.

2. The method of claim 1, further comprising configuring a second data token within the second MSRP request to indicate that the first content is incoming with respect to the second user.

3. The method of claim 1, wherein the first data token comprises a header within a CPIM (common presence and instant messaging) data object.

4. The method of claim 1, wherein:
   determining that the first user has another communication device associated with the first user comprises determining that the first and third communication devices are associated with a common user ID.

5. A method performed by a first communication device, the method comprising:
   receiving a first MSRP (message session relay protocol) request, the first MSRP request specifying first content, the first MSRP request having a first data token indicating that the first content comprises incoming content from a second communication device;
   receiving a second MSRP request, the second MSRP request specifying second content, the second MSRP request having a second data token indicating that the second content comprises outgoing content from a third communication device to the second communication device to synchronize the first communication device with the third communication device with respect to the second content being outgoing, wherein the first communication device and the third communication device are associated with a common user ID (identity);
   presenting the first and second content to a user of the first communication device; and
   based at least in part on the first data token and the second data token, indicating to the user that the first content is incoming and that the second content is outgoing.

6. The method of claim 5, further comprising:
   sending a third MSRP request, the third MSRP request specifying third content;
   presenting the third content to the user with the first and second content; and
   indicating to the user that the third content is outgoing.

7. The method of claim 5, wherein:
   the presenting comprises presenting the content as a conversation comprising a sequence of messages; and
   the indicating comprises visually distinguishing between incoming and outgoing content within the conversation.

8. The method of claim 5, further comprising registering availability with an IMS (IP multimedia system) network, wherein the registering comprises indicating that the first communication device is capable of examining the received MSRP requests to determine whether the content is incoming or outgoing.

9. The method of claim 8, wherein the registering comprises providing a third data token indicating that the first communication device is capable of examining the received MSRP requests to determine whether the content is incoming or outgoing.

10. The method of claim 9, further comprising specifying the third data token within a request header of a SIP (session initiation protocol) register request.

11. The method of claim 9, further comprising specifying the third data token as a request-disposition field within a request header of a SIP session initiation protocol) register request.

12. The method of claim 5, wherein each of the first and second data tokens comprises a header within a respective CPIM (common presence and instant messaging) data object.

13. A first communication device comprising:
one or more processors;
one or more non-transitory computer-readable media storing computer-executable instructions that, when executed on the one or more processors, cause the one or more processors to perform actions comprising:
receiving a first MSRP (message session relay protocol) request, the first MSRP request specifying first content, the first MSRP request having a first header indicating that the first content comprises incoming content from a second communication device;
receiving a second MSRP request from an IMS network, the second MSRP request specifying second content, the second MSRP request having a second header indicating that the second content comprises outgoing content from a third communication device to the second communication device to synchronize the first communication device with the third communication device with respect to the second content being outgoing content, wherein the first communication device and the third communication device are associated with a common user ID (identity);
examining the first header to determine that the first content is incoming content;
examining the second header to determine that the second content is outgoing content;
displaying the first and second content to a user of the first communication device as a conversation comprising a sequence of messages; and
based at least in part on the examining the first header and the examining the second header, indicating to the user that the first content is incoming and that the second content is outgoing.

14. The first communication device of claim 13, the actions further comprising:
sending a third MSRP request, the third MSRP request specifying third content;
presenting the third content to the user with the first and second content; and
indicating to the user that the third content is outgoing.

15. The first communication device of claim 13, the actions further comprising registering availability with the IMS (IP multimedia system) network, wherein the registering comprises indicating that the first communication device is capable of examining received MSRP requests to determine whether the content is incoming or outgoing.

16. The first communication device of claim 15, wherein the registering comprises providing a data token indicating that the first communication device is capable of examining the received MSRP requests to determine whether the content is incoming or outgoing.

17. The first communication device of claim 16, the actions further comprising specifying the data token as a request-disposition field within a request header of a SIP (session initiation protocol) register request.

18. The first communication device of claim 13, wherein each of the first and second headers is specified within a respective CPIM (common presence and instant messaging) data object.

* * * * *